Dec. 9, 1947.   B. S. ROBSON   2,432,210
VARIABLE RATIO GEARING
Filed March 10, 1945   5 Sheets-Sheet 1

*Inventor*
*Briton Selby Robson*
By
Stebbins, Blenko & Webb
*Attorneys*

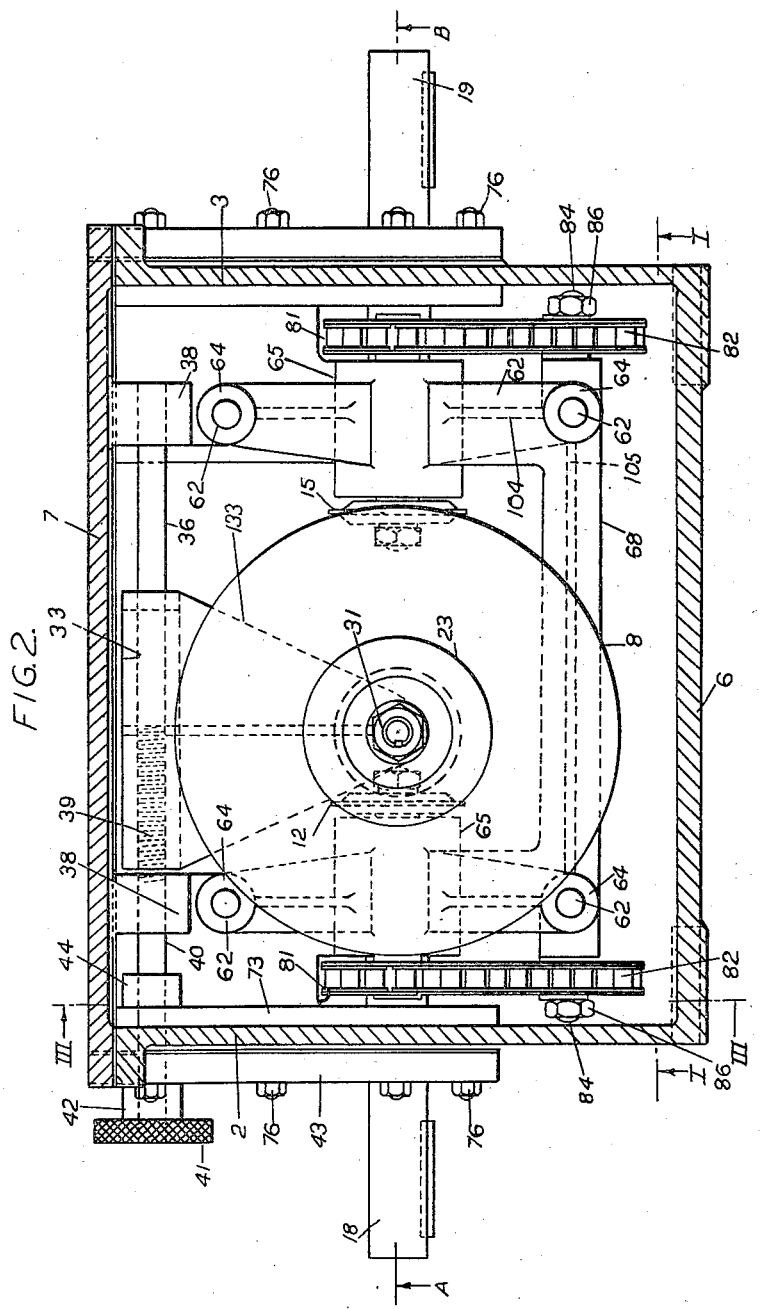

Dec. 9, 1947.   B. S. ROBSON   2,432,210
VARIABLE RATIO GEARING
Filed March 10, 1945       5 Sheets-Sheet 3
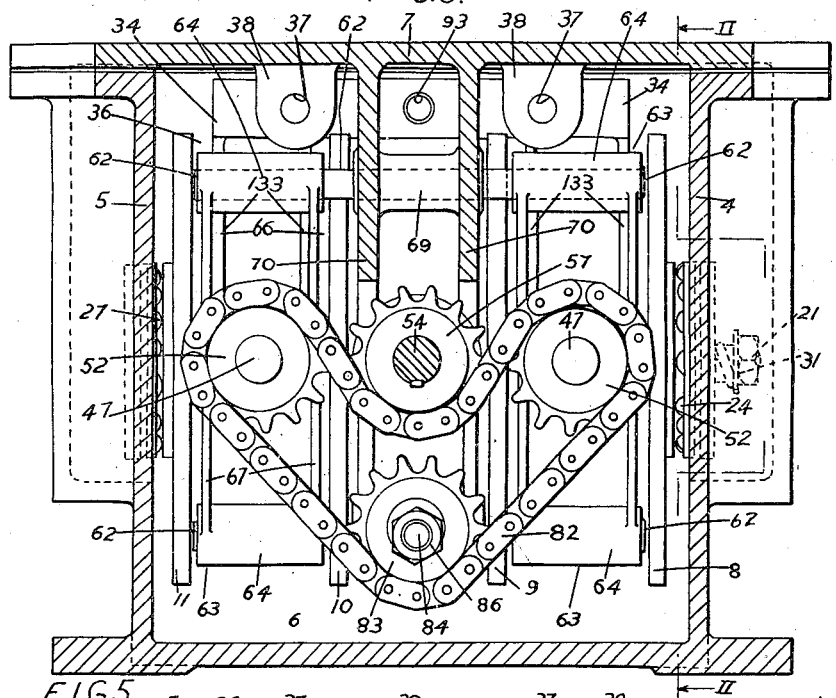
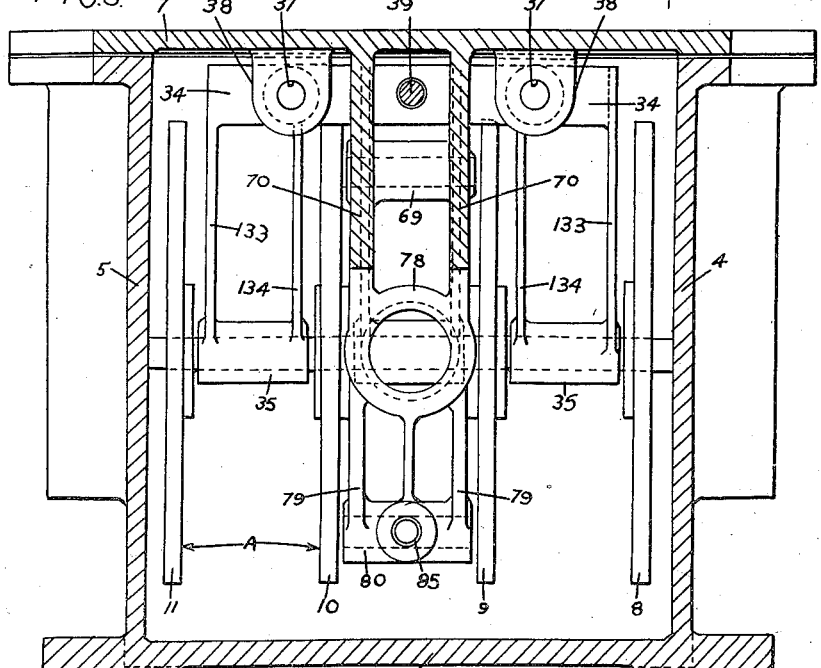
Inventor
*Briton Selby Robson*
By
*Stebbins, Blenko & Webb*
Attorneys

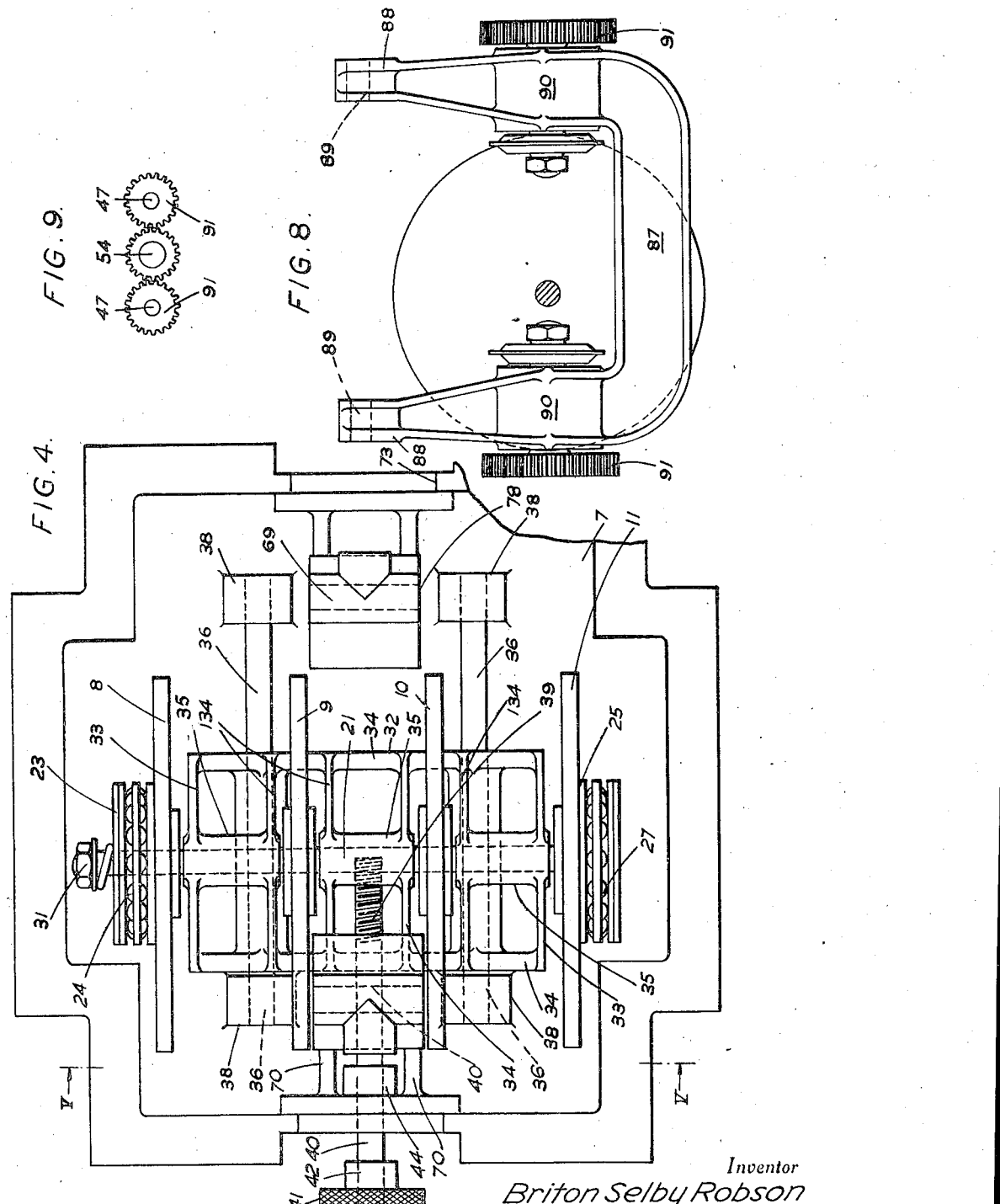

Dec. 9, 1947.  B. S. ROBSON  2,432,210
VARIABLE RATIO GEARING
Filed March 10, 1945  5 Sheets-Sheet 5

Inventor
Briton Selby Robson
By
Stebbins, Blenko & Webb
Attorneys

Patented Dec. 9, 1947

2,432,210

UNITED STATES PATENT OFFICE 2,432,210

VARIABLE RATIO GEARING

Briton Selby Robson, Huyton Quarry, near Liverpool, England, assignor, by mesne assignments, to British Insulated Callender's Cables Limited, London, England, a company of Great Britain Application March 10, 1945, Serial No. 582,154
In Great Britain March 24, 1944

7 Claims. (Cl. 74—195)

This invention relates to variable ratio gearing of the type in which transmission of motion takes place through a friction disc (hereinafter called the "transmitting disc") on the face of which work input and output discs which make edge contact with it, the ratio being varied by producing relative movement between the transmitting disc and the input and output discs so that the distances of these discs from the centre of the transmitting disc are changed progressively. In such a gear the input and output discs have their nominal lines of contact with the transmitting disc on one and the same line, which passes through the axis of rotation of the transmitting disc, and relative movement between input and output discs and the transmitting disc takes place parallel to this line. In many cases the input and output discs are fixed in position relative to each other so that they keep the same distance apart while changing their positions relative to the centre of the transmitting disc.

The invention provides an improved form of gear of this type in which substantial power may be transmitted in a structure of compact form and with small wear. This is done by utilising a number of sets of transmitting and input and output discs working in parallel and arranged to share the load accurately, even under conditions such that appreciable wear takes place. In this arrangement each set of input and output discs is mounted in a frame or other carrier and these carriers are arranged alternately with the transmitting discs to form a group, the outside members of which are transmitting discs. The members of the group are mounted under compression acting along the common axis of the transmitting discs and all, or all but one of them, are capable of movement under this pressure so that uniform contact pressure is maintained between all the adjacent disc surfaces. Accordingly, the power transmitted at each of these surfaces is substantially the same at any instant.

The drives to the input discs are connected in parallel in such a way that slight lateral displacement of some of the parts relative to the others can take place without disturbing the drive. A similar arrangement is also provided on the output side. All the carriers are operatively grouped together and similarly guided as a set while the transmitting discs are also mounted as a set. These two sets are supported so that relative movement can take place between them. Preferably the carriers are fixed and the transmitting discs are moved so as to vary the relative positions of the input and output discs on the transmitting discs.

The invention will be described further with the aid of the accompanying drawings wherein:

Figure 2 is a sectional elevation on the line II—II of Figure 3.

Figure 3 is a sectional elevation on the line III—III of Figure 2.

Figure 4 is an underneath plan view with certain parts removed.

Figure 5 is a sectional elevation on V—V of Figure 4.

Figure 8 is a side elevation of a detail illustrating a modification and,

Figure 9 is a side elevation of another detail.

Figure 1:
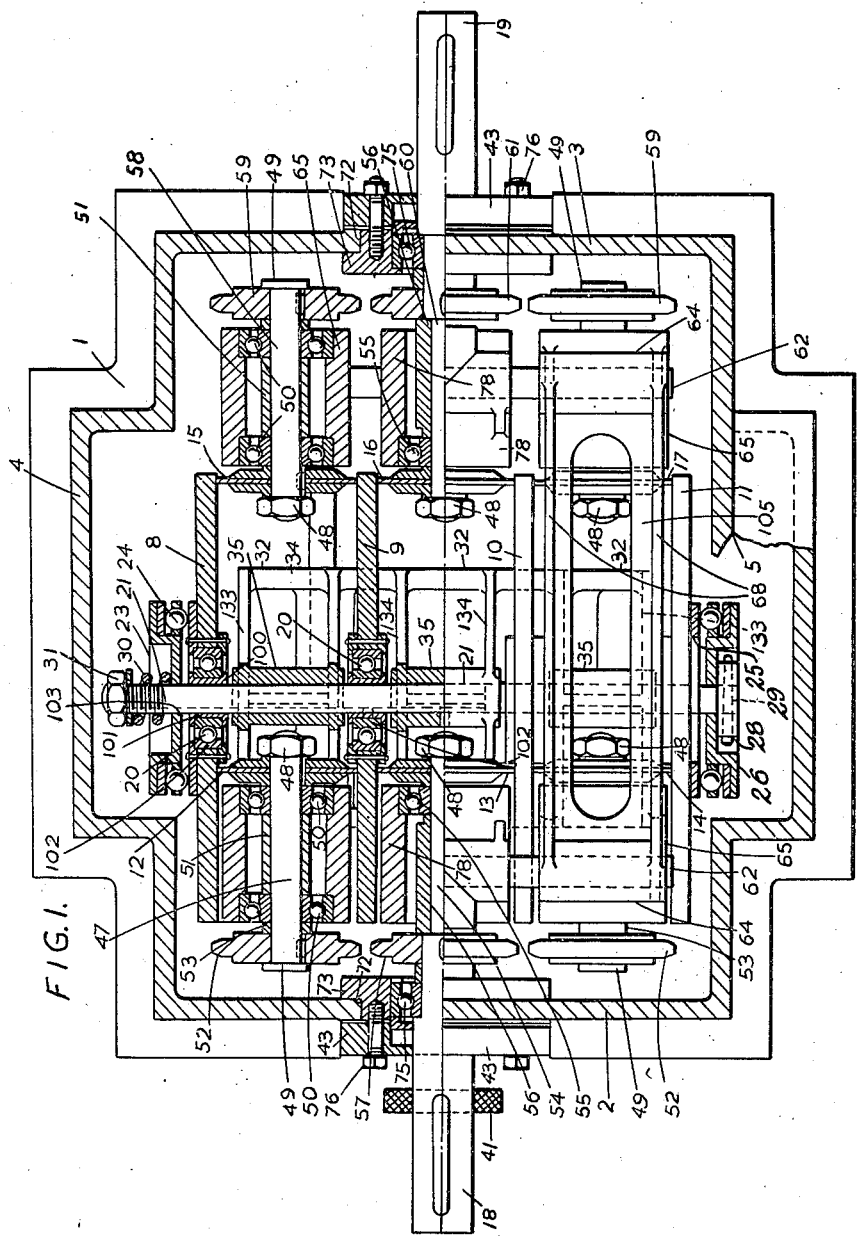
Figure 1 is an underneath plan of the gearing, the lower half of the figure being a section on I—I of Figure 2 and the upper half being a section taken on the line A—B of Figure 2.

Referring first of all to Figures 1–7 and particularly to Figures 1–3, the variable ratio gearing comprises a set of transmitting discs 8, 9, 10 and 11 and sets of discs 12, 15, 13, 16, and 14, 17. The discs 12 and 15 form a set, the discs 13 and 16 form another set and the discs 14 and 17 form a third set. The transmitting discs and the three sets of discs are arranged to work in parallel. The main shafts to which power is supplied and from which power is delivered are indicated by the reference numerals 18 and 19. The three discs 12, 13 and 14 are associated respectively with the three gear wheels 52, 57 and 52 and the three discs 15, 16 and 17 are associated respectively with the gear wheels 59, 61 and 59. Power from a prime mover (not shown) may be delivered to the main shaft 18 and be transmitted through the gearing to the main shaft 19 or the power may be delivered to the shaft 19 and be transmitted through the gearing to the shaft 18. For convenience of description it will be assumed that power delivered from a prime mover to shaft 18 is transmitted through the gearing to the shaft 19, the shaft 18 being referred to in the following description as the main input shaft and the shaft 19 as the main output shaft. Similarly the discs 12, 13 and 14 will be referred to as the input discs and the gear wheels associated therewith, as the input gear wheels, and the discs 15, 16 and 17, as the output discs and the gear wheels associated therewith, as the output gear wheels.

In the example illustrated power delivered to the main input shaft 18 is delivered through three paths in parallel to the main output shaft 19. In one of these power delivered to input disc 13 is transmitted by discs 9 and 10 to output disc 16. In another path, power delivered to input disc 12 is transmitted by discs 8 and 9 to the output disc 15 and in the third path, power delivered to input disc 14 is transmitted by discs 10 and 11 to the output disc 17. The three input gear wheels 52, 57 and 52 are coupled together and similarly, the three output gear wheels 59, 61 and 59 are coupled together.

In the particular arrangement being described, there are two outer sets of input and output discs, the input disc 12 and its output disc 15 forming one set and the input disc 14 and its output disc 17 forming the other outer set. Between these two sets and in symmetrical relationship thereto is mounted the third set consisting of input disc 13 and output disc 16. All of the input and output discs are of the same size and all the input, output and transmitting discs are mounted in compression so as to maintain adjacent working faces in contact. The distance between the input and output discs of each set is the same and remains fixed and the ratio of transmission is varied by moving the transmitting discs 8—11 as a whole in a direction at right angles to the common axis of those discs. Adjacent transmitting discs rotate in opposite directions and the input and output discs of a set also rotate in opposite directions.

Each set of input and output discs is mounted in a carrier which will be described later and a portion of which is shown at 65 in section in the upper half of Figure 1 and in an underneath plan view in the lower half of that figure. It will be seen from Figure 1 that the carriers and their sets of input and output discs are arranged alternately with the transmitting discs to form a group and that the outside members of the group are transmitting discs, namely, the discs 8 and 11.

The transmitting discs are all mounted in ball bearings 20 upon a shaft 21 having its longitudinal axis at right angles to the common axis of the main input and output shafts 18 and 19. The transmitting discs are spaced appropriately along the shaft and the latter is mounted at the lower end of a frame 32, passing through bushes 35 forming part of the frame. The upper part of the frame is of substantially rectangular shape in plan having sides 34 and ends 33 and the upper part is disposed horizontally. The two ends of the frame are provided with end plates or webs 133 which, as will be seen from Figure 2, taper off in width in a downward direction. The bushes 35 are connected to the upper part of the frame 32 by the end plates 133 and also by spaced intermediate webs 134, the two outer bushes being each connected to the frame by one of the end plates 133 and by an adjacent web 134, the inner bush being connected by a pair of webs 134. The latter at their upper ends are connected to the sides 34 of the frame. In cross-section the frame 32 is of triangular shape.

The shaft 21 is axially slidable in the bushes 35 and it has at one end a helical compression spring 30, the pressure of which is adjustable by turning a nut 31 on the end of the shaft. The other end of the shaft passes through a ring 25 and it also passes freely through a hole in a recessed plate 26 which houses an enlarged head 28 integral with the shaft 21 and through which passes a tapering pin 29. The plate 26 and ring 25 are spaced by ball bearings 27, the ring 25 rotating with the transmitting disc 11.

As the shaft 21 is slidable axially, the pressure exerted by the compression spring 30 tends to press the transmitting discs 8 and 9 and the set of input and output discs disposed between those discs in one direction towards the non-slidable set of input and output discs 13, 16 and the spring tends also to press the transmitting discs 10 and 11 and the set of input and output discs mounted between those transmitting discs in the opposite direction towards the input and output discs 13, 16. The spring 30 thus tends to press all the discs together. In order that the compression may be effective, to maintain contact at the working surfaces, the transmitting discs have a certain limited amount of movement in a direction parallel with their common axis and the two outer sets of input and output discs, namely the discs 12, 15 and 14, 17 are permitted a limited amount of movement in a direction parallel with the longitudinal axis of the shaft 21. Axial movement of the transmitting discs 8—11 relative to the shaft 21, which latter does not rotate, is obtained by mounting the inner ball bearing rings 100 in bushes 101 provided with keys 102 slidable in keyways 103 in the shaft 21. The amount of sliding movement required for the transmitting and sets of input and output discs, in practice, will be very small.

The shaft 21 at the end at which the compression spring 30 is mounted passes freely through a hole in a recessed plate 23 which serves to locate the thrust bearing 24.

As already described, the set of transmitting discs is mounted in the frame 32 which is fixed as regards movement in a direction parallel with the axis of the shaft 21 but is slidable in a direction at right angles to that axis. The means for effecting this movement is understood most easily by references to Figures 2 and 4. The frame is slidably mounted upon a pair of horizontally disposed parallel rods 36 which are themselves held rigidly in position by passing through pairs of lugs 38 having holes 37 and fixed to and extending downwards from a plate 7, which latter, in the example being described, is the cover of a casing housing the gearing. One of the sides 34 of the upper horizontal part of the frame 32 is engaged by a screw 39 which enters a tapped hole 93 in the side and has a plain stem 40 and a knob 41 for turning the screw. Axial movement of the screw is prevented by a portion 42 of the knob which portion is disposed between the knob 41 and a cover plate 43 and by a collar 44 fixed to the stem 40 and bearing against a bearing plate 73 integral with the cover 7. By turning the knob 41 the frame 32, shaft 21 and all the transmitting discs 8—11 are moved at right angles to the longitudinal axis of the shaft to vary the ratio of transmission of the gearing.

The mounting of the sets of input and output discs will now be described, referring first of all to Figure 1. Each of the discs is keyed to a shaft and all the shafts lie in a horizontal plane and the shafts for the input and output discs of a set have their longitudinal axes in alignment. The upper half of Figure 1 shows the shafts 47 and 58 having keyed respectively thereto the input disc 12 and the output disc 15, the two shafts being in axial alignment. The two discs are mounted adjacent the inner ends of their shafts and sprockets 52 and 59 respectively are mounted adjacent the outer ends of the shafts. Each shaft is mounted in ball bearings 50 held apart by a spacing sleeve 51 through which the shaft passes and a spacing ring 53 is mounted on the shaft between the outer of the ball bearings and the sprocket, the whole being held together in a housing 65 by a nut 48 on the inner end of the shaft and a shoulder 49 at the outer end of the shaft. The mounting of the set of discs 12, 15 is the same as that for the set of discs 14, 17 and in each case the set of input and output discs is mounted in a carrier of which the two housings 65 form a part.

The construction of the carriers for the two outer sets of input and output discs, which have a limited amount of sliding movement in a direction parallel with the longitudinal axis of the shaft 21, will be understood by reference in particular to Figures 2 and 3. Each carrier in side view forms approximately a U-shaped member having two sides connected together at their lower ends. Each side member of the carrier is composed of a pair of upper side plates 66 and a pair of lower side plates 67, the adjacent ends of the plates being connected to a housing 65. At their upper ends the side plates 66 are connected to a bush 64 and the side plates 67 at their lower ends are also connected to a bush 64. Each pair of side plates is connected by a web 104 and the two supports 65 are connected rigidly together by a plate 105 having downwardly extending webs 68.

As stated above the two carriers for the input and output discs 12, 15 and 14, 17 are of the same construction and they are mounted on four horizontally disposed rods 62, serving as guides the upper rods passing through the upper bushes 64 and the lower rods passing through the lower bushes. The two upper rods 62 are disposed a short distance below the rods 36 and are at right angles thereto and they are supported from the cover 7 by bushes 69 which are fixed in a pair of spaced plates 70 which extend downwardly from the cover and are integral therewith. The upper rods 62 pass through the bushes 69. The two carriers are permitted a small amount of movement on the rods 62 in a direction parallel with the longitudinal axis of the shaft 21.

The carrier for the set of input and output discs 13, 16 is fixed, that is to say, it has no sliding movement parallel to the axis of the shaft 21 and the mounting of those input and output discs is slightly different from that for the other two sets of discs. The input disc 13 is keyed to a shaft 54 and a ball bearing 55 is provided adjacent the disc. The shaft passes through a spacing sleeve 56 separating the ball bearing from the input gear wheel 57 and shaft 54 is integral with the main input shaft 18. A nut 48 is provided at the inner end of the shaft 54 and the shaft 18 is mounted in ball bearings 75. The output disc 16 is keyed to a shaft 60 which is integral with the main output shaft 19 and the other constructional details are the same as for the input disc 13.

Figure 6:
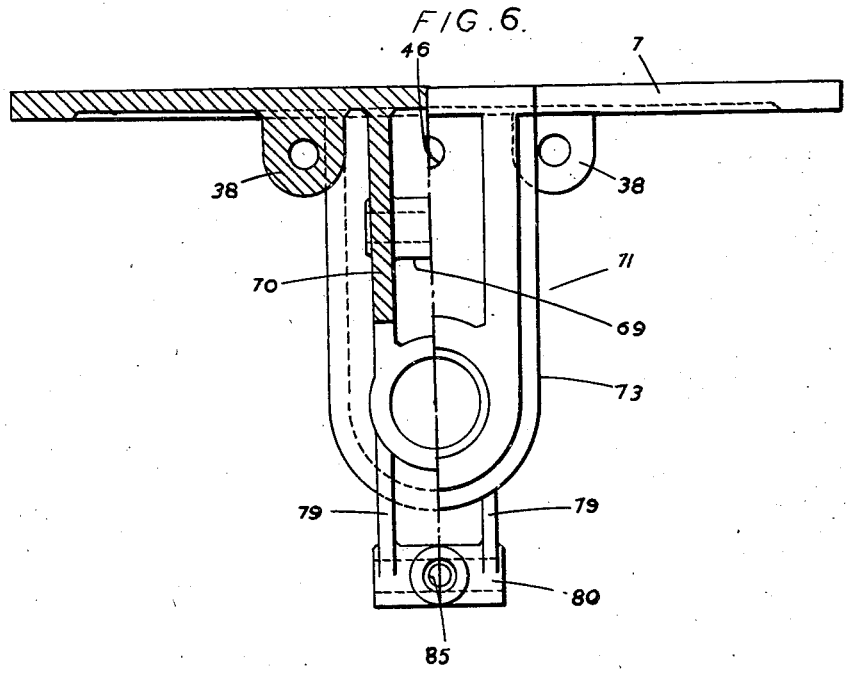
Figure 6 is an end elevation of a detail partly in section, the section being taken on the line VI—VI of Figure 7 and, Figure 7 is a side elevation partly in section, of the detail shown in Figure 6.
Figure 7:
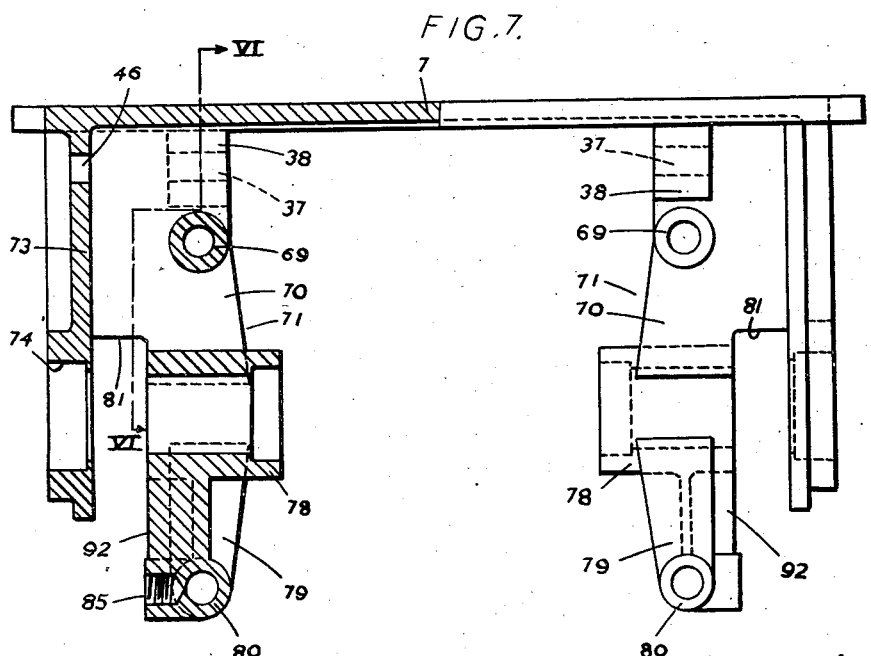

The construction of the fixed carrier for the input and output discs 13, 16 is shown in Figures 6 and 7 to which reference will now be made. The carrier is indicated generally by the reference numeral 71 and comprises a double bracket each portion of which has a housing 78, one being for the shaft 54 and the other for the shaft 60, the inner surfaces of the housings being recessed at their outer ends to receive the ball bearings 53. Each of the housings 78 is itself supported from the cover 7 by a pair of the plates 70 which lie parallel with each other and extend downwards from the cover 7 and are at right angles thereto and are integral therewith. The plates 70 are also integral with a bearing plate 73 and project inwards at right angles thereto. Each of the plates 73 has an aperture 74 in which is mounted a ball bearing 75 (Figure 1) in which the main input or output shaft 18 or 19 is mounted. Between the inner end of each aperture 74 and the outer ends of the corresponding housing 78, the metal of the plates 73 is cut away to provide spaces 81 for the mounting of the input and output sprockets 57 and 61 respectively. It will be understood that the two housings are in axial alignment.

From the underside of each of the housings 78 there extends downwardly a thick stem or plate 92 having side pieces or webs 79 and terminating in a bush 80, the two bushes 69 and the bushes 80 providing for the passage of the rods 62 which pass through the carriers for the other two sets of input and output discs.

The gearing is shown supported inside a casing indicated generally in Figure 1 by the reference numeral 1. The gearing is supported as a whole from the cover 7 of the casing which has end walls 2 and 3, side walls 4 and 5 and a bottom 6. The bearing plate 73 has an aperture 46 (see Figure 7) for the passage of the stem 40 of the screw 39 which moves the frame 32.

The two bearing plates 73 are received in apertures 72 in the end walls 2, 3 (see Figure 1) and are held in position by bolts 76 which pass through holes in the plates 43 and enter tapped holes in the bearing plates 73.

As will be seen from Figure 1, the input and output sprockets are mounted on their shafts between the ends of the carriers and the end walls 2, 3 of the casing 1. It will be necessary for the sprockets to provide for the movements of the two outer sets of input and output wheels inwards towards the inner fixed set while maintaining proper driving connection. This result may be obtained by using gear wheels of various forms and with different means for coupling the wheels together. Figure 3 shows two outer sprockets 52 and the sprocket 57 placed between them, the two outer wheels being driven from the middle wheel by a chain 82, the tension of which is adjustable by an eccentrically mounted sprocket 83, the latter being mounted on a stud 84 which enters a tapped hole 85 (Figure 7) provided in the lower end of plate 92. A nut 86 holds the sprocket in position. The sprockets on the output side are similarly arranged.

In the construction described above the carriers for the two outer sets of input and output discs are slidably mounted. This arrangement, however, need not necessarily be adopted and Figure 8 is intended to indicate an alternative arrangement. In that figure, the numeral 87 represents an approximately U-shaped frame, in the two vertically disposed sides of which, are provided housings 90, one being for the input disc of one set and the other for the output disc of that set. At its upper end, apertures 89 are provided in bosses 88 and the frame is pivotally mounted upon one of the rods which support the frame 32 (Figure 1) the rod passing through the two apertures 89 so that the compression spring 30 may press the set of input and output discs against an adjacent transmitting disc. Direct drive may be used in place of a chain. Figure 9 illustrates an example of such a drive, the two outer wheels 91 being placed initially at a distance in respect of the centre wheel slightly greater than their pitch diameter so that they are constantly in mesh.

It will be understood that the invention is not limited to an arrangement of transmitting and input and output discs which provide for the transmission of power through three paths in parallel.

In the construction according to the invention the load to be transmitted is split up into parallel paths thus reducing the wear at the working surfaces and the transmitting and input and output discs are maintained in contact, any wear at those surfaces being taken up by appropriate movements of the discs so that the load is shared uniformly.

What I claim as my invention is:

1. Variable ratio gearing comprising a shaft, a set of spaced transmitting discs mounted on the shaft, a frame carrying the shaft, sets of input and output discs, carriers for the sets of input and output discs arranged alternately with the transmitting discs, the said transmitting discs, input and output discs and the carriers forming a group, the outer members of which group are transmitting discs, the sets of input and output discs and transmitting discs being arranged to work in parallel, a spring at one end of the shaft maintaining the members of the group under compression, at most one of the said members being fixed and the remainder being movable under the pressure exerted by the spring, and means for moving the frame to move the transmission discs across the working faces of the input and output discs.

2. Variable ratio gearing comprising a shaft, spaced transmitting discs mounted on the shaft, sets of input and output discs the transmitting discs and the input and output discs being arranged to work in parallel, guides disposed at right angles to the shaft, a frame carrying the shaft and slidably mounted upon the guides, guides disposed parallel with the shaft, carriers for the sets of input and output discs, at most one of the said carriers being fixed and the remainder of said carriers being slidably mounted upon the guides disposed parallel with the shaft, the carriers for the input and output discs being arranged alternately with the transmitting discs to form a group, the outer members of which group are transmitting discs, a spring at one end of the shaft maintaining the members of the group under compression, at most one of said members being fixed and the remainder of said members being movable under the pressure exerted by the spring, and means for moving the frame to move the transmission discs across the working faces of the input and output discs.

3. Variable ratio gearing comprising a shaft, spaced transmitting discs mounted on the shaft, sets of input and output discs, the transmitting discs and the input and output discs being arranged to work in parallel, guides disposed at right angles to the shaft, a frame carrying the shaft and slidably mounted upon the guides, carriers for the sets of input and output discs, at most one of said carriers being fixed and the remainder of said carriers being pivotally mounted upon the guides, the carriers being arranged alternately with the transmitting discs to form a group, the outer members of which are transmitting discs, a spring at one end of the shaft maintaining the members of the group under compression, at most one of said members being fixed and the remainder of said members being movable under the pressure exerted by the spring and means for moving the frame to move the transmission discs across the working faces of the input and output discs.

4. Variable ratio gearing comprising an axially movable shaft, a set of transmitting discs mounted on the shaft, a frame carrying the shaft, an inner set of input and output discs and at least one outer set of input and output discs disposed on each side of the inner set of input and output discs, means for moving the frame to move the transmitting discs across the working faces of the input and output discs, the transmitting discs and the input and output discs being arranged to work in parallel, a fixed carrier for the inner set of input and output discs, carriers for the outer sets of input and output discs movable inwards towards the fixed carrier, the carriers for the sets of input and output discs being arranged alternately with the transmitting discs and forming a group of which the outer members are transmitting discs, a spring at one end of the shaft maintaining the members of the group under compression, interconnected input gearing disposed on the input side of the sets of input and output discs for the input discs and interconnected gearing disposed on the output side of those sets, the said input and output gearing maintaining driving connection and permitting movement of the outer sets of input and output discs inwards towards the inner set.

5. Variable ratio gearing comprising at least two input discs and at least two output discs, each input disc co-operating with an output disc and forming a set, a carrier for each of such sets, and at least three transmitting discs spaced along a common axis, which is substantially at right angles to that of each set of input and output discs, the carriers being arranged alternately with the transmitting discs to form groups having transmitting discs as their outside members, means for producing relative movement between the sets of input and output discs and the transmitting discs to vary the transmission ratio, means acting along the common axis of the transmitting discs for placing the members of a group under compression, at most one of the members of the group being fixed and the remainder of the members being movable under the compression means.

6. Variable ratio gearing comprising at least two input discs and at least two output discs, each input disc co-operating with an output disc and forming a set, a carrier for each of such sets, and at least three transmitting discs spaced along a common axis, which is substantially at right angles to that of each set of input and output discs, the carriers for the input and output discs being arranged alternately with the transmitting discs to form groups having transmitting discs as their outside members, means coupling all the input discs together, means coupling all the output discs together, means for producing relative movement between the sets of input and output discs and the transmission discs to vary the gear ratio, means acting along the common axis of the transmitting discs for placing the members of a group under compression, at most one of the members of the group being fixed and the remainder being movable under the compression means, the coupling means remaining effective whilst permitting such movement to take place.

7. Variable ratio gearing comprising a shaft, at least three transmitting discs spaced apart along the shaft, at least two input discs and at least two output discs, each input disc co-operating with an output disc and forming a set, the discs of each set having their common axis substantially at right angles to that of the shaft, a carrier for each of such sets, the carriers being arranged alternately with the transmitting discs to form groups of which the outside members are transmitting discs, means acting along the axis of the shaft for placing the members of a group under compression, at most one of the members of the group being fixed and the remainder being movable under the compression means, the movable transmitting discs being axially slidable upon the shaft upon which they are mounted and the movable carriers being pivotally mounted about an axis at right angles to the shaft, and means for producing relative movement between the input and output discs and the transmitting discs to vary the gear ratio.

BRITON SELBY ROBSON.

REFERENCES CITED

The following references are of record in the file of this patent:

UNITED STATES PATENTS

| Number | Name | Date |
| --- | --- | --- |
| 790,362 | Guttner | May 23, 1905 |
| 1,042,720 | Richards | Oct. 29, 1912 |